United States Patent
Herring et al.

(10) Patent No.: US 7,544,266 B2
(45) Date of Patent: Jun. 9, 2009

(54) PROCESS OF MAKING LAMINATED SHEET AND PRODUCT MADE BY THE PROCESS

(75) Inventors: William A. Herring, Valparaiso, IN (US); Shannon K. Crawford-Taylor, Merrillville, IN (US); Suwit (John) Sangkaratana, Crown Point, IN (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/850,953

(22) Filed: May 21, 2004

(65) Prior Publication Data

US 2005/0257880 A1     Nov. 24, 2005

(51) Int. Cl.
  B32B 38/14      (2006.01)
  B32B 37/22      (2006.01)
(52) U.S. Cl. .................... 156/277; 156/300; 40/1.5; 40/124.01; 40/124.191; 428/203; 428/204
(58) Field of Classification Search .......... 156/230, 156/233, 235, 237, 241, 246, 247, 277, 289, 156/300; 428/42.1, 195.1, 200–204, 207, 428/209, 457, 916; 40/1.5, 124.01, 124.191
See application file for complete search history.

(56) References Cited

U.S. PATENT DOCUMENTS

| | | | |
|---|---|---|---|
| 4,100,011 A | | 7/1978 | Foote |
| 4,287,285 A | * | 9/1981 | Mosehauer ............. 430/124 |
| 4,594,125 A | | 6/1986 | Watson |
| 4,684,795 A | | 8/1987 | Colgate, Jr. |
| 4,897,533 A | | 1/1990 | Lyszczarz |
| 5,073,221 A | * | 12/1991 | Waitts et al. ............ 156/253 |
| 5,120,589 A | | 6/1992 | Morikawa et al. |
| 5,318,816 A | * | 6/1994 | Yin et al. ................ 428/41.8 |
| 5,429,025 A | | 7/1995 | Bartsch et al. |
| 5,653,844 A | | 8/1997 | Abrams |
| 5,700,037 A | * | 12/1997 | Keller ..................... 283/107 |
| 5,716,472 A | * | 2/1998 | Rossetti .................. 156/164 |
| 5,785,355 A | | 7/1998 | Main |
| 5,882,463 A | * | 3/1999 | Tompkin et al. ......... 156/234 |
| 5,958,178 A | | 9/1999 | Bartsch et al. |
| 6,025,283 A | | 2/2000 | Roberts |
| 6,095,220 A | | 8/2000 | Kobayashi et al. |

(Continued)

FOREIGN PATENT DOCUMENTS

EP    1 045 761 B1    10/2000

(Continued)

OTHER PUBLICATIONS

English Abstract of JP 09-204661.*

(Continued)

*Primary Examiner*—Philip C Tucker
*Assistant Examiner*—Sing P Chan
(74) *Attorney, Agent, or Firm*—Patula & Associates, P.C.

(57) ABSTRACT

A process of making an improved sheet/card laminate for packaging, signage, displays, transaction cards, ID cards and the like. The process comprises registering flat sheets to a film and then laminating the film or transferring coating(s) from the film to the individual, generally flat sheets via an adhesive. The film or coating(s) may include layered security, functional and/or decorative features.

33 Claims, 5 Drawing Sheets

U.S. PATENT DOCUMENTS

| | | |
|---|---|---|
| 6,409,872 B1 | 6/2002 | Campion et al. |
| 6,471,128 B1 | 10/2002 | Corcoran et al. |
| 6,491,782 B1 | 12/2002 | Jaynes |
| 6,627,286 B1 * | 9/2003 | Lutz .......................... 428/40.9 |
| 6,640,717 B2 | 11/2003 | Kosaka et al. |
| 6,644,551 B2 | 11/2003 | Clayman et al. |
| 6,668,716 B2 | 12/2003 | Tsuruta et al. |
| 6,693,655 B2 | 2/2004 | Fujimoto et al. |
| 6,817,530 B2 * | 11/2004 | Labrec et al. ............... 235/487 |
| 2002/0113988 A1 | 8/2002 | Matsuoka |
| 2002/0135652 A1 | 9/2002 | Matsuhashi et al. |
| 2003/0007061 A1 | 1/2003 | Ogawa |
| 2004/0029030 A1 | 2/2004 | Murray |
| 2005/0067497 A1 * | 3/2005 | Jones et al. ................. 235/492 |
| 2005/0072849 A1 * | 4/2005 | Jones ........................ 235/487 |

FOREIGN PATENT DOCUMENTS

| | | |
|---|---|---|
| JP | 09204661 A * | 8/1997 |
| WO | WO 01/69521 A1 | 9/2001 |

OTHER PUBLICATIONS

English Machine translation of JP 09-204661.*
Billhofer U.S.A. Inc. letter dated Apr. 21, 2003 regarding a Billhofer EK 76/114 30"×45" Sheet Lamintor Machine.
Photocopy of a Telecom USA card, 1989.
Photocopies of an Auqafresh package, 1999.

* cited by examiner

PROCESS OF MAKING LAMINATED SHEET AND PRODUCT MADE BY THE PROCESS

The present disclosure relates to an improved process of making laminated sheets with and without registered imagery and the product made by the process, and in particular, a process for the production of laminated sheets for transaction cards (such as credit cards), license/identification cards and the like. A further application of the present disclosure is the use of laminated sheets for packaging, signage, displays and the like. Specifically, the present disclosure relates to a process of laminating a film or foil layer to a substrate layer to produce sheets of laminated stock.

BACKGROUND OF THE INVENTION

Laminated sheets and cards are used in many industries for many purposes. Typical uses of laminated sheets include packaging, banners, decorative/informational signs, point of purchase displays and the like. Typical uses of laminated cards made from these sheets include credit cards, driver's licenses, ID cards, phone cards, gift cards, loyalty cards, game cards, key cards and the like. These laminated sheets and cards are constructed from multiple layers of plastic or paper based substrates, holographic, metallized, printed or clear films or foils, and adhesives and coatings. These laminate cards also usually include printing, graphics, and/or other features such as security elements.

An example of such laminated cards and the method of making the same is discussed in U.S. Patent No. U.S. Pat. No. 6,471,128 B1 ("the '128 patent") issued to Corcoran et al. on Oct. 29, 2002. The entire disclosure of the '128 patent is herein incorporated by reference.

Difficulties arise in the production of these laminated cards, which must ultimately meet certain standards, such as with respect to peel strength or resistance to delamination. Further, defects such as bubbles or wrinkles between layers, and warping, curling or bowing of the final laminated cards may occur during or after the manufacturing process. Warping may occur as a result of a roll laminating process wherein rolls of material constituting each layer are adhered together as they are unrolled, coated and fed into a lamination press with unbalanced tension. Further, roll-to-roll laminating requires the heavier plastic materials to be wound up and thus they take on roll set curl (i.e. a memory of having been wound up into a coil).

A balanced, symmetrical construction is optimal in order to prevent curling or bowing in the finished cards. Thus, even if only one side of the card requires a laminated film, such as a metallized film or diffraction surface, the opposite side of the composite construction should have a matching film type (though may be clear, printed, metallized, etc.). Accordingly, one such known card laminate comprises a split core substrate of two adjacent layers of 12 mil (300 micron) white PVC copolymer core stock. Laminated to one side of each of the PVC split cores is 0.75 gauge (19 micron) or 0.92 gauge (23 micron) PET holographic, metallized, brushed, coated, printed or clear film, with or without tie coat. A tie coat or primer may be used to improve the bond between the adhesive and the metallized surface of the film. This lamination involves a roll to roll lamination process using water-based aliphatic polyester urethane adhesive with a $T_{act}$ of 250° F.

The resulting card laminate is then sheeted off-line in a process whereby sections of the laminate are cut to a desired length, for example to a size of 24"×28.5" and then using a guillotine or other cutting method to square the sheet. Registration of the holographic imagery to the sheet is not instrument controlled or automated. These sheets are next printed, and then fused back to back with two adhesive coated 2 mil (50 micron) PVC overlays on top and bottom to form the outer skins in a second and final lamination step, which is typically performed by the card manufacturer. The printed sheets are then reduced to card size in any manner known in the art. Features such as signature panels, holograms and/or decorative foils are often applied to the individual cards as required or desired. These cards are then embossed on standard personalization equipment.

The above described card laminate and process of producing the same has many benefits, such as heat resistant holography and metallization, bright holography, stable oriented PET, excellent bond strength of coatings to PET to prevent delamination, and tie coat on metal to improve bond between adhesive and metal. However, the above described card laminate and process of producing the same has many drawbacks as well. For example, PVC in roll form due to roll set curl causes sheet curl and rippled edges, and PVC in roll form may limit certain product constructions. The roll-to-roll laminating process requires specialty sheeting to achieve registered imagery, heavier adhesive coat weights that can create visual defects, and final lamination cycle required to activate adhesive and achieve peel strength requirements for the typical end uses, such as ANSI/ISO specifications.

The sheet and card laminate and process of the present disclosure, however, overcomes the problems and disadvantages of prior art sheet and card laminate and methods of producing the same. The present disclosure provides for a cost-effective and time saving process for making card laminate which has improved characteristics and features over known prior art sheet and card laminates.

SUMMARY OF THE INVENTION

The method of one disclosed embodiment comprises the steps of providing generally flat sheets of a substrate, and feeding the generally flat sheets to a lamination area wherein a film or foil layer is registered with and laminated to the generally flat sheets to produce improved laminated sheets to generate transaction cards, license cards, ID cards, phone cards, gift cards, loyalty cards, game cards, key cards and the like. Further, these improved laminated sheets may also be used for packaging, signage, displays and the like. The laminated sheets of the disclosed embodiment exhibit improved characteristics and benefits over known prior art, including with respect to the above described curling or bowing, which is effectively minimized or eliminated by the method disclosed herein. The films may or may not include a variety of layered security, functional and/or decorative features which are applied to or incorporated in the film or foil before or during the laminating process.

Accordingly, it is the principal object of the disclosed embodiment(s) to provide a method for making improved laminated sheets for transaction cards, license cards, ID cards, phone cards, gift cards, loyalty cards, game cards, key cards and the like. Further, these improved laminated sheets may also be used for packaging, signage, displays and the like.

It is a further object of the disclosed embodiment(s) to provide an improved card laminate for transaction cards, license cards, ID cards, phone cards, gift cards, loyalty cards, game cards, key cards and the like. Further, these improved laminated sheets may also be used for packaging, signage, displays and the like.

It is also an object of the disclosed embodiment(s) to provide a method for making sheets of card laminate by laminating a film or foil layer to generally flat sheets of a plastic or paper based substrates to produce an improved sheet or card laminate.

It is another object of the disclosed embodiment(s) to overcome the problems and disadvantages of prior art sheet or card laminates and methods of producing sheet or card laminates, and to realize improvements and benefits there over.

Numerous other advantages and features of the disclosed embodiment(s) will become readily apparent from the detailed description, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE DISCLOSED EMBODIMENT(S)

While the process and the product produced by the process disclosed herein are susceptible of embodiment in many different forms, there is shown in the drawings and will be described herein in detail one or more preferred embodiments. It should be understood, however, that the present disclosure is to be considered an exemplification of the principles of the invention and is not intended to limit the spirit and scope of the invention and/or claims of the embodiment (s) illustrated.

Figure 1:
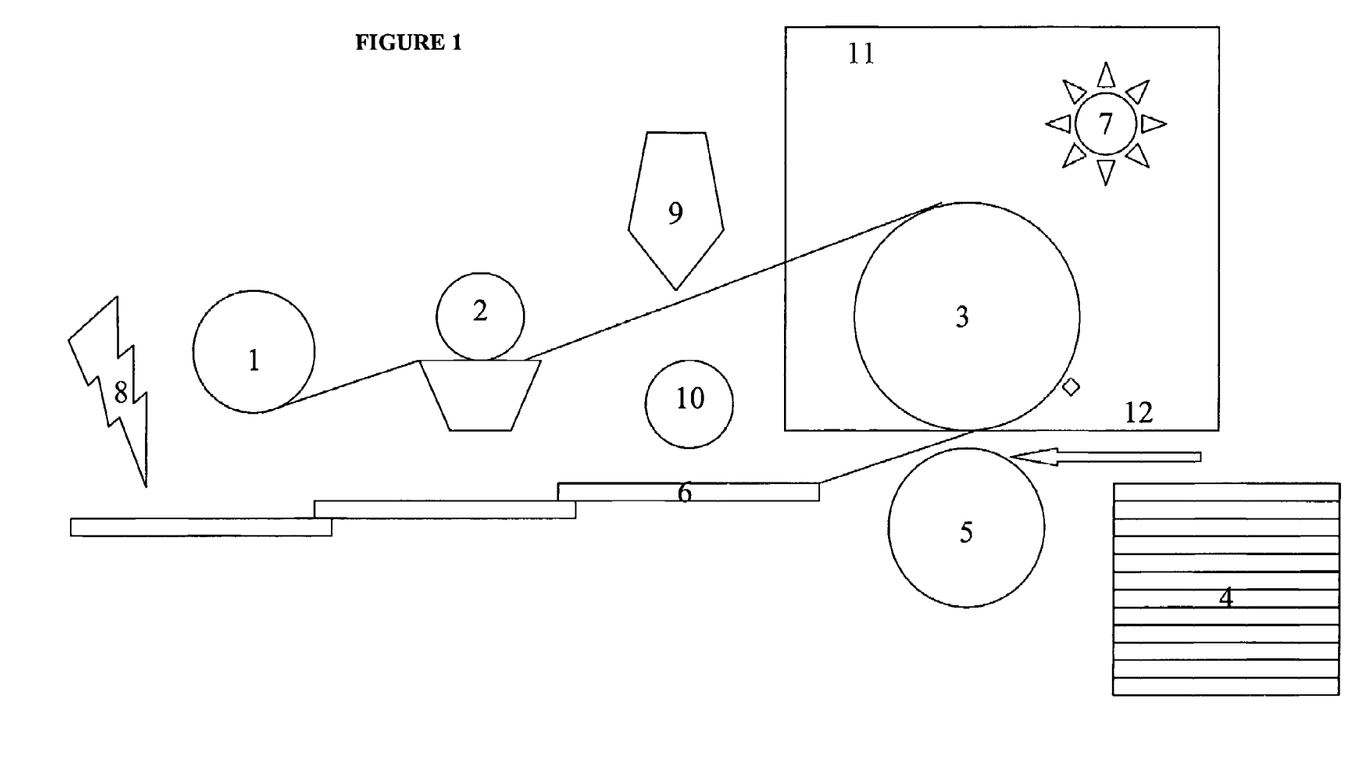
FIG. 1 is a schematic diagram illustrating the process of the disclosed embodiment.

FIG. 1 is a schematic diagram illustrating the process of the disclosed embodiment. The process involves generally the lamination of a film or foil layer onto individual sheets of a substrate or core layer. The film or foil layer may have at least one side which is holographic, metallized (vapor deposited metals or other compounds), brushed, coated, printed or clear film, with or without tie coats. Additionally, a variety of layered security, functional and/or decorative features are selectively applied to the film or foil before or during the laminating process.

Accordingly, in the illustrated embodiment, a roll of film 1, which selectively has applied thereto a variety of layered security, functional and/or decorative features (see FIG. 5), is unrolled and passes through a coating station 2, wherein the film 1 is coated in-line with laminating adhesive. The coated film next passes around a heated drum 3 in an oven 11, where the adhesive coated film is dried. Alternatively, in place of the coating station, a heat seal adhesive is pre-coated onto the film, and then activated by the oven and heated drum. In another embodiment, the adhesive can be radiation curable, and in place of drying the adhesive in the oven, the adhesive is cross-linked by exposing it to a UV light 7 prior to or after lamination, or by irradiating the sheets with an electron beam ("EB") source 8 after lamination. In yet another embodiment, the film can be coated in-line with a hot melt adhesive via a hot melt/extrusion die 9.

A backing roller 5 is located proximate the oven and heated drum to form a laminating nip. A generally flat stack of sheets 4 of the substrate or core stock are suitably supported adjacent the backing roller 5. The sheets 4 are fed into the laminating nip by any suitable sheet feeding mechanism and/or conveyor system (not shown), as is known in the art of sheet feeding. As the sheets are fed into the laminating nip, a registration unit 12 registers the sheets 4 with the film 1.

Figure 2:
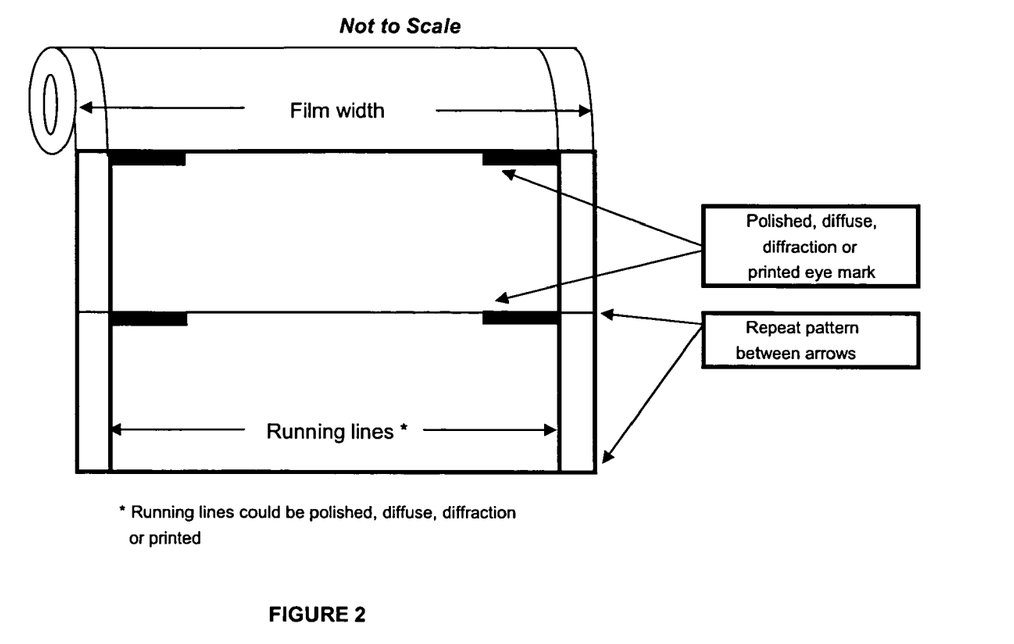
FIG. 2 is an illustration depicting an embodiment of the registration layout on the film.

Preferably, the film 1 includes a distinguishing mark, imagery and/or running line, as illustrated in FIG. 2. The registration unit 12 reads the imagery, registration mark or line and registers it to the individual sheets 4 by synchronizing the feeding of the sheets with the passage of the film into the nip. More specifically, as film 1 travels around drum 3, the sheets 4 are carried on a conveyor towards the lamination nip (point between drum 3 and backing roller 5). The registration unit 12 detects the eye mark or image on film 1 and signals a drive to adjust the positioning of sheet 4 so that the registration mark is placed on the leading edge of sheet 4 or other desired, repeatable position.

FIG. 2 shows an example of the positioning of registration eye marks and running lines in a roll of film. Examples of eye marks or images or running lines include polished (polished or buffed into an embossing shim), diffuse (physically scratched, chemically etched or sand blasted into an embossing shim), diffraction (mark/line on embossing shim which diffracts light (into a rainbow)), or printed (printed onto film).

The registration unit 12 optically detects the contrast between a distinguishing mark (eye mark or running line) or image (logo, picture, etc.) and the adjacent background, for example, the contrast between a smooth polished eye mark on a holographic background, a diffuse or diffraction mark next to a holographic or metallized area, the contrast between an embossed image itself and the background, or an eye mark or running line printed with an ink density different than the adjacent area. Further, the registration unit 12 can be moved perpendicular to web direction to read the distinguishing mark across the film.

After registration, the film 1 is then laminated onto the sheets 4 as they pass through the nip in register, thus producing improved sheets or card laminate 6. The sheets or card laminate 6 are then separated, for example, by cutting or notching the film with a moving blade at the point where the adjacent sheets overlap, or notching the film with a perforation wheel and propagating a tear or cut, and stacked. Any suitable cutting and/or separating devices may be used as is known in the art. Preferably, the film is laminated such that the holographic, metallized (vapor deposited metals or other compounds), brushed, coated or printed, with or without tie coats side of the film is coated with the adhesive. It should be understood however that the film can be laminated with the above features facing up, or those features may be on both sides of the film to be laminated.

In an alternate embodiment, the film is a hot stamp or cold transfer product. An adhesive is applied (with total or partial or pattern coverage) and cured via one of the above described methods. The sheet is then registered and fed in synch with the film into the lamination nip. In this instance, the adhesive removes selective portions or all of the coating or coatings from the film, effectively transferring, in register, the coating (s) or selective portions thereof to the sheets. After transfer of the coating(s) or portions thereof, the spent film is removed from the sheets and wound onto a rewind drum 10. The laminated/decorated sheets are then separated, collected and stacked.

Figure 3:
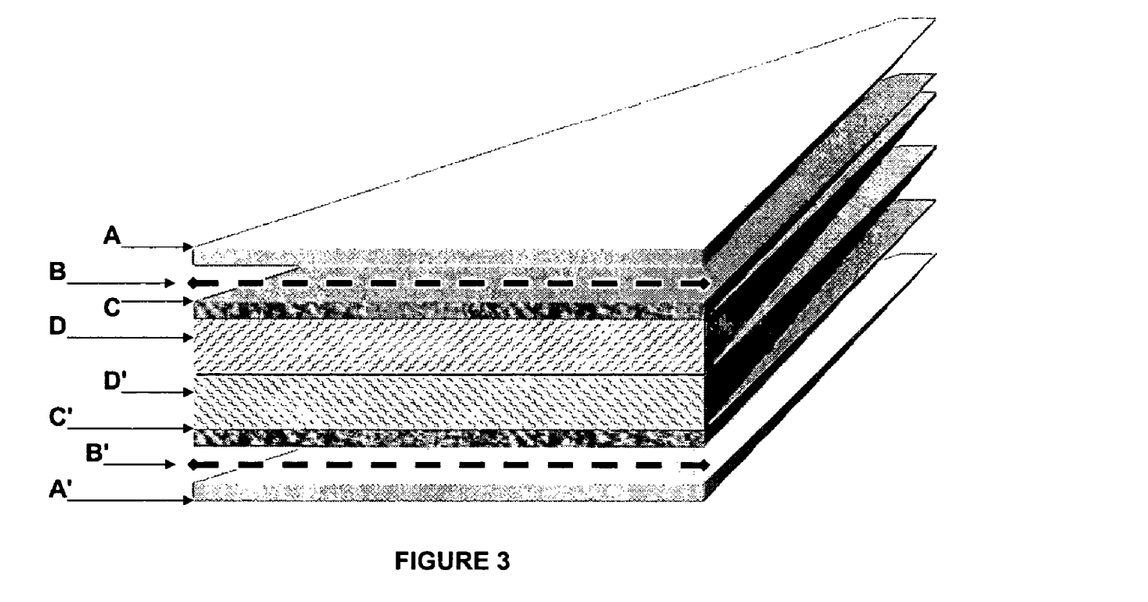
FIG. 3 is an illustration depicting an embodiment of the laminate sheet and card construction.

FIG. 3 illustrates one embodiment of the laminate sheet and card construction. A sheet or card laminate from the above described process, represented by C, D, D' and C', where D and D' are the sheets 4, and C and C' are the foil 1, may be compiled with additional layers, illustrated as layers A, B, B' and A', to form a composite which may then be cut or punched into individual units of varying size and shapes. The various layers of the illustrated embodiment of FIG. 3 are defined as follows.

Component A is a protective overlay, typically PVC (polyvinyl chloride) or PETG (glycol modified polyethylene terephthalate) but could be other materials, or component A may not be used.

Component B is on the surface of Component C, typically several layers of graphic print and indicia, or component B may not be used.

Component C is typically a PET (polyethylene terephlathate) film containing one or a combination of layered functional, decorative and/or security features, though the film could also be APET (amorphous polyethylene terephthalate), PBT (polybutadiene terephthalate), PETG, OPP (oriented polypropylene) and other olefins, PVC, acrylic, ABS (acrylonitrile butadiene styrene terpolymer), HIPS (impact modified polystyrene), PS (polystyrene), PC (polycarbonate), co-extruded films and the like.

Component D is typically PVC or PETG but could be APET, PC, PS, ABS, acrylic, olefins such as PE (polyethylene) and PP (polypropylene), HIPS, paper, board stock and the like.

Component D' is typically PVC or PETG but could be APET, PC, PS, ABS, acrylic, olefins such as PE and PP, HIPS, paper, board stock and the like, or not used.

Component C' is typically a PET film containing one or a combination of layered functional, decorative and/or security features, though the film could also be APET, PBT, PETG, OPP and other olefins, PVC, acrylic, ABS, HIPS, PS, PC, co-extruded films and the like.

Component B' is printed on the surface of Component C', typically indicia or graphic print, or component B' may not be used.

Component A' is a protective overlay, typically PVC or PETG but could be other materials, or component A' may not be used.

Figure 4:
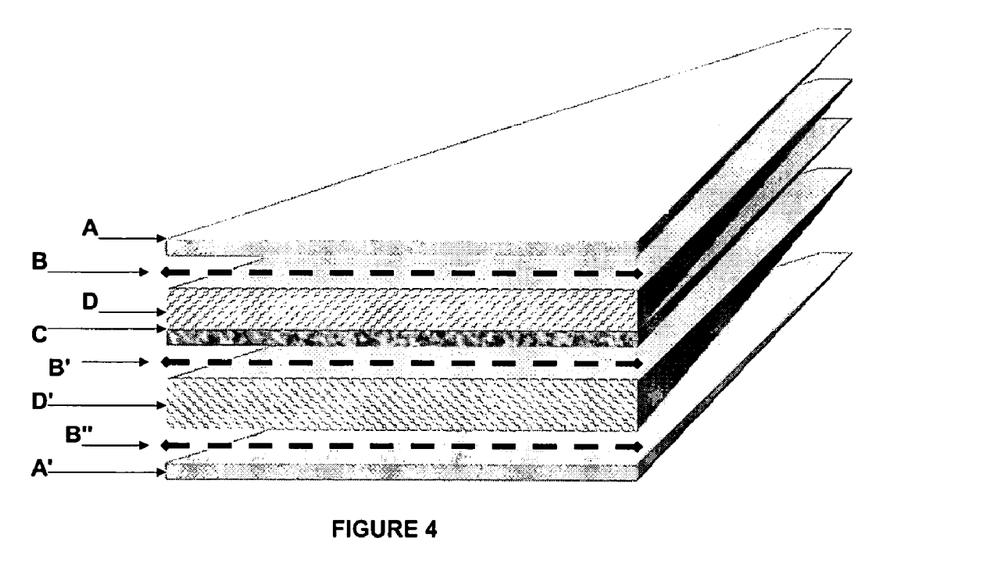
FIG. 4 is an illustration depicting another embodiment of the laminate sheet and card construction.

FIG. 4 another embodiment of the laminate sheet and card construction. A sheet or card laminate from the above described process, represented by C, D and D', where D and D' are the sheets 4, and C is a foil 1, may be compiled with additional layers, illustrated as layers A, B, B', B" and A', to form a composite which may then be cut or punched into individual units of varying size and shapes. The various layers of the illustrated embodiment of FIG. 4 are defined as follows.

Component A is a protective overlay, typically PVC but could be other materials, or component A may not be used.

Component B is on the surface of Component D, typically graphic or indicia print, or component B may not be used.

Component D is typically PVC or PS but could be PETG, APET, PC, ABS, acrylic, olefins such as PE and PP, HIPS, paper, board stock and the like.

Component C is typically a PET film containing one or a combination of layered functional, decorative and/or security features, though the film could also be APET, PBT, PETG, OPP and other olefins, PVC, acrylic, ABS, HIPS, PS, PC, co-extruded films and the like.

Component B' is on the surface of Component C, typically graphic or indicia print, or component B' may not be used.

Component D' is typically PVC or PS but could be PETG, APET, PC, ABS, acrylic, olefins such as PE and PP, HIPS, paper, board stock and the like.

Component B" is on the surface of Component D', typically graphic or indicia print, or component B" may not be used.

Component A' is a protective overlay, typically PVC but could be other materials, or component A' may not be used.

The base film (Component C or C') can be any material described herein, and may selectively include at least one security, functional or decorative feature or combinations thereof. These features can be layered on the film, become buried in the construction, and the integrity of the composite is maintained throughout the sheet lamination process. The laminated sheets or cards subsequently hold up to secondary high temperature lamination processes to achieve product specifications as called out for each specific end use.

Some examples of decorative features are tint coats, texture coats, graphics, woodgrain or marble patterns printed onto the film by a number of printing methods known in the industry—roto gravure, flexo, screen printing, offset and digital using water or solvent based thermoplastic inks, radiation curable inks, dye sublimation and the like. Additionally the film may be vacuum metallized (with metal or other compounds) with or without tint coats. A decorative feature could also be hot stamped or transferred onto the film in a separate operation.

Some examples of functional features are performance coatings imparting heat, chemical, UV and abrasion resistance and IR absorbance, as well as modifying the coefficient of friction (slip coat) or antistatic property. Coatings such as these could be coated or applied to the base film in any of the methods described herein.

Any one or a combination of security features described herein may be added to the film. Holographic imagery in a wallpaper pattern or specifically registered images could be embossed into either heat resistant or normal holographic base coatings using embossing techniques known to the industry. Embossed film may be coated with vacuum deposited metals or other compounds (such as aluminum oxide, zirconium oxide, titanium dioxide), resulting in products commonly classified as metallized or high refractive index. The film could also be coated with optically variable coatings. Further, these products could undergo a selective demetallization process, either direct (metal removing solution printed directly onto metallized surface) or indirect (mask printed in areas to retain metal then film passed through the demetallizing solution), in which a portion of the vacuum metallized layer is removed in register to an embossed holographic image. As an extension to this, the resulting demetallized layer could be coated with a clear or tint layer to index out the embossed image and thereafter re-metallized, resulting in a combination of holographic imagery with an unembossed metallized layer of a different color. The order in which the embossing, metallization, demetallization, indexing out and re-metallization could occur is not fixed. Also, embossed images can be 2D or 3D, morphing holograms, contain microtext, bar codes or other machine-readable features. Finally, security inks such as though identified herein can be printed in register to any of the above-described films prior to laminating in register to sheet stock. Security inks could be overt or covert and fall into general categories of UV fluorescent, phosphorescent, pearlesence, glow-in-the-dark, IR absorbing/reflecting, color shifting (OVI), thermochromic, photochromic, magnetic, containing taggants/markers/tracers or be tamper evident. Inks could be printed in patterns such as barcodes, readable images, arrays and the like.

Figure 5:
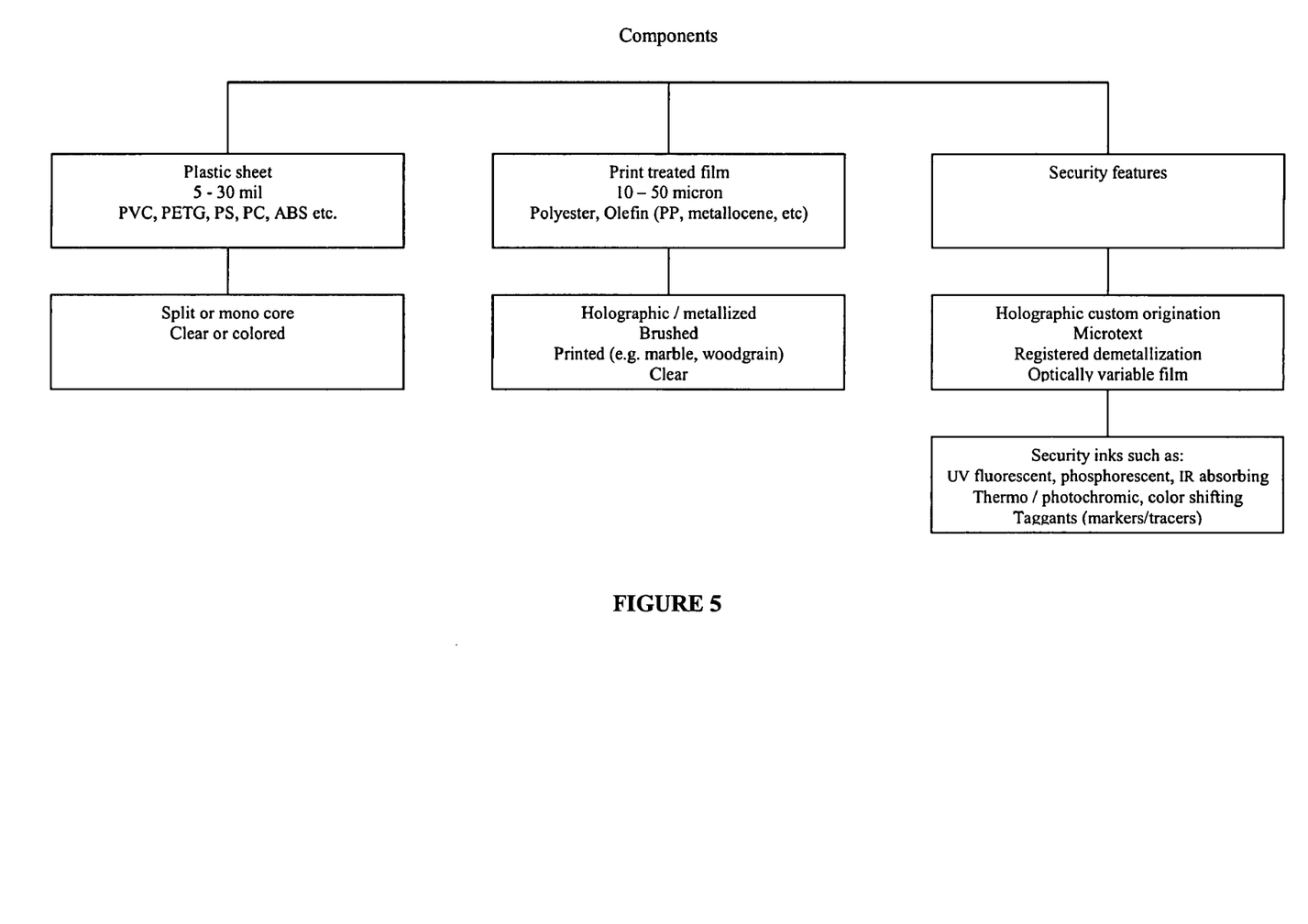
FIG. 5 is a chart summarizing the various components which may be selectively incorporated into the laminate sheet and card construction.

FIG. 5 illustrates various features that can be selectively incorporated into the laminated sheets or cards, allowing customization of the laminated sheets or cards.

For transaction cards, the sheets 4 are preferably 12 mil PVC copolymer. However, the sheets can range from approximately 5 to 30 mil, especially for other sheet stock to produce other card types, such as ID cards, phone cards, gift cards, loyalty cards, casino cards, etc. The sheets can be clear, translucent or colored. Alternate materials can also be used, for example, PVC homopolymer, PET, APET, PETG, PC, PS, ABS, acrylic, olefins such as PE/PP, HIPS, paper and board stock. The cards can have a split core (two sheets) or mono core (one sheet). PVC homopolymer is not typically employed for split core lamination, but is suitable for mono-core lamination.

The film 1 is preferably 12-23 um low haze, heat stable, print treated biaxially oriented PET. However, the film can range from approximately 10-50 um. Alternate film materials can also be used, for example, APET, PETG, PBT, OPP, PVC, acrylic, PC, PS, ABS, HIPS and co-extruded films. Olefinic films (PP, metallocene catalyzed, etc.) can be used for certain applications not demanding post lamination processes, or requiring ANSI/ISO performance. Specific functional and aesthetic coatings can be applied to the film to provide the desired security features, performance and appearance, as discussed below. The film can be metallized (vapor deposited metal or other compounds), holographic, brushed, printed (e.g., graphics, logos, indicia, marble, woodgrain, etc.), tint or clear, and may include layered security features as discussed below.

The security features in the film can be layered and can take many different forms, which may be overt or covert. For example, the film may include custom holographic imagery that can be in a wallpaper pattern or with images specifically registered to the sheet or final card. The holographic originations may include one or more of the following: microtext, 2D or 3D images, or morphing holograms, and the like. The film may include selective demetallization, or in the case of embossed films with or without indexing out the holographic image. The film may include a vacuum deposited metal, other compounds or high refractive index layer. The film may be coated or printed with optically variable materials.

Further, inks or additives may be provided on or in coatings on the film. Examples of such inks or additives include UV fluorescent, phosphorescent, pearlesence, IR absorbing/reflecting, color shifting (OVI), thermochromic, photochromic, taggants, markers, tracers, magnetic ink, in patterns (such as barcodes, readable images, or arrays), or tamper-evident elements.

These security features, inks or additives can be applied to the film in various manners. For example, they can be applied in a flood coat (covering the entire film); they can be coated in a continuous pattern (such as a wallpaper type pattern); they can be coated in a pattern of registered print; or they can coated with machine readable features/print.

The type of adhesive used, how the adhesive is applied, or whether the coatings are laminated to the sheet as a laminate with the film or transferred from the film, is generally dependent on factors such as what feature or features are being incorporated into the laminated sheet or card, production costs, performance criteria, etc.

Where the adhesive is applied by the coating station, the adhesive is preferably a water-based laminating adhesive, which is 100% solvent free. Such an adhesive has a peel strength well above the minimum requirement, and is suitably water and chemical resistant, per ANSI/ISO 7810 standards. Where the adhesive is pre-coated onto the film, a heat seal adhesive is preferably used. This adhesive can be water or solvent based or extrusion coated. In either instance, the adhesive is custom formulated for each sheet stock to optimize adhesion to the sheet stock and meet any ultimate performance requirements. The film may or may not have a tie coat to improve bond between film/coating and the sheet stock.

Accordingly, the disclosed process and product made by the process exhibit numerous improvements and benefits in sheet and card laminates, such as no roll curl set, availability of mono-core substrates, alternate plastics to PVC, and higher peel strength. Further, the sheet and card laminates disclosed herein meets ANSI/ISO requirements without a second (final) lamination. Still further, holographic, demetallized and printed imagery on the film can be laminated to the sheet or card stock in register. Additionally, downstream print artwork can be registered with the film imagery on the laminated sheet after the sheets are laminated. For example, in the first case the film could be printed in register to a holographic or demetallized pattern on the film. In the latter, individual laminated sheets having a series of images across the sheet could be printed in register using various type of sheet fed printing presses.

It is to be understood that the embodiment(s) herein described is/are merely illustrative of the principles of the present invention. Various modifications may be made by those skilled in the art without departing from the spirit or scope of the claims which follow.

What is claimed is:

1. A process for laminating sheets of a core substrate layer to produce sheets of core stock used in composite laminate sheets each comprising a plurality of sections which can be cut into individual cards, comprising the steps of:

continuously feeding a supply of generally flat sheets of a core substrate layer of a single material to a lamination nip;

continuously feeding an intermediate film or foil layer to the lamination nip, wherein the intermediate film or foil layer includes at least one security, functional or decorative feature or layer on a surface of the intermediate film or foil layer for each of the plurality of sections;

wherein the at least one security feature or layer comprises holographic imagery characterized by at least one of a holographic pattern, a custom image having demetallization of a vacuum deposited metal or other compounds or high refractive index, morphing holograms, barcodes, machine readable images, or arrays, or an ink or additive having at least one characteristic of UV fluorescent, photoluminescent, phosphorescent, IR absorbing/reflecting, color shifting (OVI or OVD), thermochromic, photochromic, taggants, markers, tracers, barcodes, readable images, arrays, or tamper-evident elements, or a vacuum deposited metal surface having at least one characteristic of being continuous, demetallized, brushed, or having decorative images, security images or effects, or UV or IR or optically variable components;

wherein the at least one functional feature or layer comprises a performance coating or treatment having at least one characteristic of heat resistance, chemical resistance, UV resistance, abrasion resistance, modified coefficient of friction or antistatic property;

wherein the at least one decorative feature or layer is at least one of a tint coat, texture coat, graphics, indicia, woodgrain, argent, stone or marble pattern;

laminating the intermediate film or foil layer to the sheets of core substrate layer to produce sheets of core stock; and producing; the composite laminate sheets, by additionally applying; at least one print layer or at least one overlay layer, to an outer surface of intermediate film or foil layer wherein the at least one security, functional and/or decorative feature or layer for each of the plurality of sections are buried between the intermediate film or foil layer and the core substrate layer.

2. The process of claim 1, wherein the at least one security, functional or decorative feature or layer on the intermediate film or foil layer for each of the plurality of sections are transferred fully or in part in register to the sheets of core substrate layer.

3. The process of claim 2, further comprising the step of reducing the composite laminate sheet into individual cards each having the at least one security, functional or decorative feature or layer in register, without a post lamination application of security, functional or decorative features.

4. The process of claim 1, wherein the generally flat sheets of core substrate layer are fed to the lamination nip from a stack of sheets.

5. The process of claim 1, further comprising the step of applying an adhesive which is water or solvent based, heat seal, hot melt or radiation curable to the intermediate film or foil layer prior to the intermediate film or foil layer entering the lamination nip.

6. The process of claim 1, wherein the composite laminate sheet is split core or mono-core.

7. The process of claim 1, wherein the sheets of core substrate layer comprise PVC copolymer, PVC homopolymer, PET, APET, PETG, PC, PS, ABS, PBT, acrylic, PE/PP, HIPS, paper stock or board stock.

8. The process of claim 1, wherein the intermediate film or foil layer comprises PET, APET, PETG, PBT, OPP, other olefins, PVC, acrylic, HIPS, PS, PC or co-extruded films.

9. The product made by the process of claim 1.

10. The process of claim 1, further comprising the step of registering the intermediate film or foil layer to each flat sheet of core substrate layer as the intermediate film or foil layer and each flat sheet of core substrate layer are fed into the lamination nip.

11. The process of claim 10, wherein the intermediate film or foil layer includes at least one distinguishing mark or image, and the step of registering includes the steps of detecting the at least one distinguishing mark or image as the intermediate film or foil layer is fed to the lamination nip, and aligning the at least one distinguishing mark or image with a select location on each flat sheet of core substrate layer as the intermediate film or foil layer and each flat sheet of core substrate layer are fed into the lamination nip.

12. A lamination process for producing a sheet of core stock used in a composite laminate sheet comprising a plurality of sections which can be separated into individual cards, comprising the steps of:
selectively applying one or more security, functional or decorative features or layers on a surface of an intermediate film or foil layer for each of the plurality of sections, prior to lamination;
feeding the intermediate film or foil layer having the one or more security, functional or decorative features or layers for each of the plurality of sections to a laminating nip;
feeding a sheet of core substrate layer to the laminating nip;
laminating the sheet of core substrate layer and the intermediate film or foil layer in register to produce the sheet of core stock, wherein the one or more security, functional or decorative features or layers for each of the plurality of sections are buried between the intermediate film or foil layer and the sheet of core substrate layer; and
additionally applying at least one print layer or at least one protective overlay layer to an outer surface of the intermediate film or foil layer, wherein the at least one security, functional or decorative feature or layer for each of the plurality of sections are buried within the composite laminate sheet.

13. The process of claim 12, wherein the intermediate film or foil layer has at least one side which is holographic, metallized, brushed, coated or printed.

14. The product made by the process of claim 12.

15. The process of claim 12, further comprising the step of coating the intermediate film or foil layer with a laminating adhesive prior to the intermediate film or foil layer entering the laminating nip.

16. The process of claim 15, further comprising the step of cross-linking the laminating adhesive.

17. The process of claim 12, further comprising the step of registering the intermediate film or foil layer to one or more specific locations on the sheet of core substrate layer so that each of the at least one security, functional or decorative feature or layer for each of the plurality of sections is in register on each individual card when the composite laminate sheet is separated into individual cards.

18. The process of claim 17, wherein the intermediate film or foil layer includes at least one distinguishing mark or image, and the step of registering includes the steps of detecting the at least one distinguishing mark or image as the intermediate film or foil layer is fed to the laminating nip, and aligning the at least one distinguishing mark or image with a select location on the sheet of core substrate layer as the intermediate film or foil layer and the sheet of core substrate layer are fed into the laminating nip.

19. A sheet of laminated core stock for use in a composite laminate sheet having a plurality of sections which can be selectively separated into individual cards, comprising:
a sheet of core substrate layer;
an intermediate film or foil layer laminated to the sheet of core substrate layer;
at least one functional, decorative or security feature on a surface of the intermediate film or foil layer for each of the plurality of sections;
wherein the at least one functional, decorative or security feature on the intermediate film or foil layer for each of the plurality of sections are laminated in register with the sheet of core substrate layer to produce the sheet of laminated core stock such that the at least one security, functional or decorative feature or layer for each of the plurality of sections are buried within the composite laminate sheet between the intermediate film or foil layer and the core substrate layer, and additionally applying; at least one print layer at least one protective overlay layer to an outer surface of the intermediate film or foil layer.

20. The sheet of laminated core stock of claim 19, wherein the intermediate film or foil layer includes, in addition to the at least one functional, decorative or security feature for each of the plurality of sections, at least one registration element.

21. The sheet of laminated core stock of claim 19, wherein the sheet of core substrate layer is PVC, PVC copolymer, PVC homopolymer, PET, APET, PETG, PC, PS, ABS, PBT, acrylic, PE/PP, HIPS, paper stock or board stock.

22. The sheet of laminated core stock of claim 19, wherein upon reducing the composite laminate sheet into individual cards, the at least one functional, decorative or security feature for each of the plurality of sections is specifically registered on each individual card.

23. A process for making a sheet of core stock used in a composite laminate sheet comprising a plurality of sections, which can be subsequently cut into individual cards, the sheet of core stock having at least one core substrate layer and at least one intermediate film or foil layer, the process comprising the steps of:

applying at least one security, functional or decorative feature or layer to a surface of the intermediate film or foil layer for each of the plurality of sections;

feeding the intermediate film or foil layer to a lamination nip;

feeding a sheet of the core substrate layer to the lamination nip;

laminating the intermediate film or foil layer to the sheet of core substrate layer to produce the sheet of core stock, wherein the at least one security, functional or decorative feature or layer for each of the plurality of sections are buried between the intermediate film or foil layer and the core substrate layer in the sheet of core stock; and producing the composite laminate sheet by additionally applying at least one print layer or at least one protective overlay layer to an outer surface of the intermediate film or foil layer, wherein upon completing the composite laminate sheet, the at least one security, functional or decorative feature or layer for each of the plurality of sections are buried within the composite laminate sheet.

24. The process of claim 23, further comprising the step of coating the intermediate film or foil layer in-line with laminating adhesive prior to the intermediate film or foil layer entering the lamination nip.

25. The process of claim 23, further comprising the step of registering the intermediate film or foil layer to the sheet of core substrate layer prior to the step of laminating, so that each of the at least one security, functional or decorative feature or layer for each of the plurality of sections is in register on each individual card when the composite laminate sheet is cut into individual cards.

26. The process of claim 25, wherein the intermediate film or foil layer includes at least one distinguishing mark or image, and the step of registering includes the steps of detecting the at least one distinguishing mark or image as the intermediate film or foil layer is fed to the lamination nip, and aligning the at least one distinguishing mark or image with a select location on the sheet of core substrate layer as the intermediate film or foil layer and the sheet of core substrate layer are fed into the lamination nip.

27. The process of claim 25, further comprising the step of reducing the composite laminate sheet into the individual cards.

28. The product made by the process of claim 23.

29. A method of making core stock for a composite laminate sheet having a plurality of sections, the composite laminate sheet comprising at least one core substrate layer fused together with at least one overlay layer, the method comprising the steps of:

selectively providing one or more security, functional or decorative features or layers on a surface of an intermediate film or foil layer for each of the plurality of sections, the intermediate film or foil layer having a thickness in the range of 10 microns to 50 microns;

feeding the intermediate film or foil layer having the one or more security, functional or decorative features or layers for each of the plurality of sections to a laminating nip;

feeding a sheet of core substrate layer having a thickness in the range of 5 mil to 30 mil to the laminating nip;

laminating the sheet of core substrate layer and the intermediate film or foil layer in register to produce a sheet of core stock wherein the one or more security, functional or decorative features or layers for each of the plurality of sections are buried between the intermediate film or foil layer and the sheet of core substrate layer;

wherein upon fusing at least one overlay layer to an outer surface of the intermediate film or foil layer to an outer surface of the intermediate film or foil layer to produce the composite laminate sheet, the intermediate film or foil layer having the one or more security, functional or decorative features or layers for each of the plurality of sections is buried in the composite laminate sheet.

30. The method of claim 29, wherein the intermediate film or foil layer has a thickness less than 1 mil.

31. The method of claim 30, wherein the intermediate film or foil layer has a thickness in the range of 12 microns to 23 microns.

32. The method of claim 29, further comprising the step of registering the intermediate film or foil layer to the sheet of core substrate layer prior to the step of laminating, so that each of the one or more security, functional or decorative feature or layer for each of the plurality of sections is in register with each of the plurality of sections.

33. The method of claim 32, wherein the intermediate film or foil layer further includes at least one distinguishing mark or image, and the step of registering includes the steps of detecting the at least one distinguishing mark or image as the intermediate film or foil layer is fed to the lamination nip, and aligning the at least one distinguishing mark or image with a select location on the sheet of core substrate layer as the intermediate film or foil layer and the sheet of core substrate layer are fed into the lamination nip.

* * * * *

UNITED STATES PATENT AND TRADEMARK OFFICE
CERTIFICATE OF CORRECTION

| | |
|---|---|
| PATENT NO. | : 7,544,266 B2 |
| APPLICATION NO. | : 10/850953 |
| DATED | : June 9, 2009 |
| INVENTOR(S) | : Herring et al. |

It is certified that error appears in the above-identified patent and that said Letters Patent is hereby corrected as shown below:

In Col. 1, line 30, after the phrase "in U.S. Patent No." delete the phrase "U.S. Pat. No.".

In Col. 5, line 42, after "FIG. 4" insert the word -- is --.

In Col. 6, line 56, after the phrase "such as" replace the word "though" with the word -- those --.

In Claim 1 at Col. 8, line 65, after the word "producing" delete the semicolon ";".

In Claim 1 at Col. 8, line 66, after the word "applying" replace the semicolon ";" with a comma -- , --.

In Claim 1 at Col. 8, line 67, after the word "layer" delete the comma ",".

In Claim 1 at Col. 9, line 1, after the word "layer" insert a comma -- , --.

In Claim 19 at Col. 10, line 49, after the word "applying" replace the semicolon ";" with a comma -- , --.

In Claim 19 at Col. 10, line 49, after the word "layer" insert the word -- or --.

In Claim 29 at Col. 12, line 21, after the phrase "foil layer" delete the words "to an outer".

UNITED STATES PATENT AND TRADEMARK OFFICE
CERTIFICATE OF CORRECTION

PATENT NO. : 7,544,266 B2
APPLICATION NO. : 10/850953
DATED : June 9, 2009
INVENTOR(S) : Herring et al.

It is certified that error appears in the above-identified patent and that said Letters Patent is hereby corrected as shown below:

In Claim 29 at Col. 12, line 22, before the phrase "to produce" delete the words "surface of the intermediate film or foil layer".

Signed and Sealed this

Twenty-fifth Day of August, 2009

David J. Kappos
*Director of the United States Patent and Trademark Office*